United States Patent
Kozlovsky et al.

(10) Patent No.: US 9,866,573 B2
(45) Date of Patent: Jan. 9, 2018

(54) DYNAMIC MALICIOUS APPLICATION DETECTION IN STORAGE SYSTEMS

(71) Applicant: EMC Corporation, Hopkinton, MA (US)

(72) Inventors: Vitaly Stanislavovich Kozlovsky, Saint Petersburg (RU); Dmitry Nikolayevich Tylik, Saint Petersburg (RU); Eugeny Alexeevich Novozhilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/369,093

(22) PCT Filed: Sep. 27, 2013

(86) PCT No.: PCT/RU2013/000846
§ 371 (c)(1),
(2) Date: Jun. 26, 2014

(87) PCT Pub. No.: WO2015/047126
PCT Pub. Date: Apr. 2, 2015

(65) Prior Publication Data
US 2016/0173508 A1    Jun. 16, 2016

(51) Int. Cl.
*G06F 11/00* (2006.01)
*G06F 12/14* (2006.01)
(Continued)

(52) U.S. Cl.
CPC ........ *H04L 63/1416* (2013.01); *G06F 21/566* (2013.01)

(58) Field of Classification Search
CPC . H04L 63/10; H04L 41/0631; H04L 41/0672; H04L 41/0816; H04L 63/1416;
(Continued)

(56) References Cited

U.S. PATENT DOCUMENTS 7,523,016 B1 * 4/2009 Surdulescu ........... G06F 21/316
  702/185
8,321,941 B2   11/2012 Tuvell et al.
(Continued)

FOREIGN PATENT DOCUMENTS

RU          101235 U1    1/2011
RU          101235 U1   10/2011

*Primary Examiner* — Harunur Rashid
*Assistant Examiner* — Quy Pham
(74) *Attorney, Agent, or Firm* — BainwoodHuang

(57) ABSTRACT

Improved techniques involve comparing access patterns in a storage system to expected access patterns under similar circumstances. An intrusion detection system, in response to a suspected malicious application workload, collects information about a current session on the storage processor, e.g., application workload s running, users logged in, and timestamp, as well as parameters such as storage allocation requests sampled at prespecified intervals over a period of time. In a database that stores such sampled parameter values by application workload, user, and time, the system extracts the sampled parameter values having the application workload, user, and time corresponding to the current session. The system then compares the extracted sampled parameter values with the current parameter values and computes a difference. Based on the difference, the system determines whether the storage system is accessed by a malicious application workload.

14 Claims, 4 Drawing Sheets

(51) Int. Cl.
*G06F 12/16* (2006.01)
*G08B 23/00* (2006.01)
*H04L 29/06* (2006.01)
*G06F 21/56* (2013.01)

(58) Field of Classification Search
CPC ........... G06F 11/3438; G06F 17/30144; G06F 21/316; G06F 21/554; G06F 21/566
See application file for complete search history.

(56) References Cited

U.S. PATENT DOCUMENTS

| | | |
|---|---|---|
| 8,782,341 B1 | 7/2014 | Niranjan et al. |
| 8,924,328 B1 | 12/2014 | Kozlovsky et al. |
| 9,141,305 B2 | 9/2015 | Tylik et al. |
| 2005/0197889 A1 | 9/2005 | Prigogin et al. |
| 2005/0234920 A1* | 10/2005 | Rhodes ................. G06F 21/552 |
| 2010/0115619 A1 | 5/2010 | Burtscher |
| 2012/0053925 A1* | 3/2012 | Geffin .................... G06F 1/3206 703/21 |
| 2012/0266208 A1* | 10/2012 | Morris .................... G06F 21/56 726/1 |
| 2013/0111586 A1* | 5/2013 | Jackson .............. G06F 11/3438 726/23 |

* cited by examiner

Collecting a set of values of a parameter over a particular period of time, each set of values being indicative of a state of the data storage system over the particular period of time
102

Performing a comparison operation on the set of values of the parameter and a set of historical values of the parameter over another period of time prior to the particular period of time and having a length substantially the same as the particular period of time, the set of historical values of the parameter being representative of values of the state of the data storage system substantially free of virus attacks, the comparison operation providing a comparison result indicative of a similarity between the set of values of the parameter and the set of historical values of the set of the parameters
104

Based on the comparison result, providing a decision as to whether the data storage system is accessed by a malicious application workload
106

DYNAMIC MALICIOUS APPLICATION DETECTION IN STORAGE SYSTEMS

BACKGROUND

Networked data storage systems provide convenient data access, centralized file storage, and powerful data management solutions for users. Such data storage systems and hosts connected to them, however, are susceptible to attacks by malicious $3^{rd}$ parties. As a result of such attacks, legitimate applications run on networked hosts may get infected with a virus, and malware software may get installed on hosts or the data storage system itself. Another example of destructive activity is Denial Of Service (DOS) attacks.

In carrying out each of their respective functions, such attacks may cause a storage processor that controls the data storage system to exhibit a particular response. For example, each known virus has a particular effect on a load that that virus produces on the storage processor. Along these lines, one particular virus might cause the storage processor to gradually increase storage allocation requests over a period of time, while another may cause spikes at various instances over another period of time.

In order to detect legitimate applications infected by viruses, conventional virus detection tools compare current or recent data access patterns to data access pattern signatures from known viruses. For example, such tools may record responses of a storage processor to known viruses and store such responses in a table. Such responses may take the form of a time series of storage allocation requests over a period of time, for example. When a virus attack is suspected, a conventional virus detection tool compares a time series of current storage allocation requests to the times series corresponding to the known viruses stored in the table.

SUMMARY

Unfortunately, there are deficiencies with the above-described conventional virus detection tools. For example, such detection tools require a match with an existing virus in order for detection to occur. Looking only at signatures of existing viruses, however, does not prevent new virus attacks from occurring and does not detect malware installed on hosts or a storage system.

In contrast with the above-described conventional virus detection tools which do not prevent new viruses from impacting data storage systems, improved techniques involve comparing access patterns in a storage system to expected access patterns under similar circumstances. An intrusion detection system, in response to a suspected malicious application workload, collects information about a current session on the storage processor, e.g., application workloads running, users logged in, and timestamp, as well as parameters such as storage allocation requests sampled at pre-specified intervals over a period of time. In a database that stores such sampled parameter values by application workload, user, and time, the system extracts the sampled parameter values having the application workload, user, and time corresponding to the current session. The system then compares the extracted sampled parameter values with the current parameter values and computes a difference. Based on the difference, the system determines whether the storage system is accessed by a malicious application workload.

Advantageously, the improved techniques allow for virus detection even when an application is infected by a new, unknown virus or an unknown malware accesses a storage system. A storage provides storage resources for any number of application workloads for a number of different users at various times of day or of the year. Each such application workload, user, and time provides a pattern of load on a storage processor that is indicative of that application workload, user, and time. A virus would likely change each such pattern, whether the virus is known or unknown and malware is likely to have a pattern different from that of legitimate applications.

One embodiment of the improved technique is directed to a method of monitoring a data storage system for malicious application workloads. The method includes collecting a set of values of a parameter over a particular period of time, each set of values being indicative of a state of the data storage system over the particular period of time. The method also includes performing a comparison operation on (i) the set of values of the parameter and (ii) a set of historical values of the parameter over another period of time prior to the particular period of time and having a length substantially the same as the particular period of time, the set of historical values of the parameter being representative of values of the state of the data storage system substantially free of malicious application workloads, the comparison operation providing a comparison result indicative of a similarity between the set of values of the parameter and the set of historical values of the set of the parameters. The method further includes, based on the comparison result, providing a decision as to whether the data storage system is accessed by a malicious application workload.

Additionally, some embodiments of the improved technique are directed to an apparatus constructed and arranged to monitor a data storage system for malicious application workloads. The apparatus includes memory and a set of processors coupled to the memory to form controlling circuitry. The controlling circuitry is constructed and arranged to carry out the method of monitoring a data storage system for malicious application workloads and similar methods.

Furthermore, some embodiments of the improved technique are directed to a computer program product having a non-transitory computer readable storage medium which stores code including a set of instructions which, when executed by a computer, cause the computer to carry out the method of monitoring a data storage system for malicious application workloads and similar methods.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4 is a flow chart illustrating an example method of carrying out the improved technique within the electronic environments shown in FIG. 1.

DETAILED DESCRIPTION

Improved techniques involve comparing access patterns in a storage system to expected access patterns under similar circumstances. An intrusion detection system, in response to a suspected malicious application workload, collects information about a current session on the storage processor, e.g., application workloads running, users logged in, and timestamp, as well as parameters such as storage allocation requests sampled at pre-specified intervals over a period of time. In a database that stores such sampled parameter values by application workload, user, and time, the system extracts the sampled parameter values having the application workload, user, and time corresponding to the current session. The system then compares the extracted sampled parameter values with the current parameter values and computes a difference. Based on the difference, the system determines whether the storage system has a virus.

Advantageously, the improved techniques allow for malicious application workload detection even when a new, unknown malicious application workload accesses a storage system. A storage processor provides storage resources for any number of application workloads for a number of different users at various times of day or of the year. Each such application workload, user, and time provides a pattern of load on a storage processor that is indicative of that application workload, user, and time. A malicious application workload would likely change each such pattern, whether the malicious application workload is known or unknown.

Figure 1:
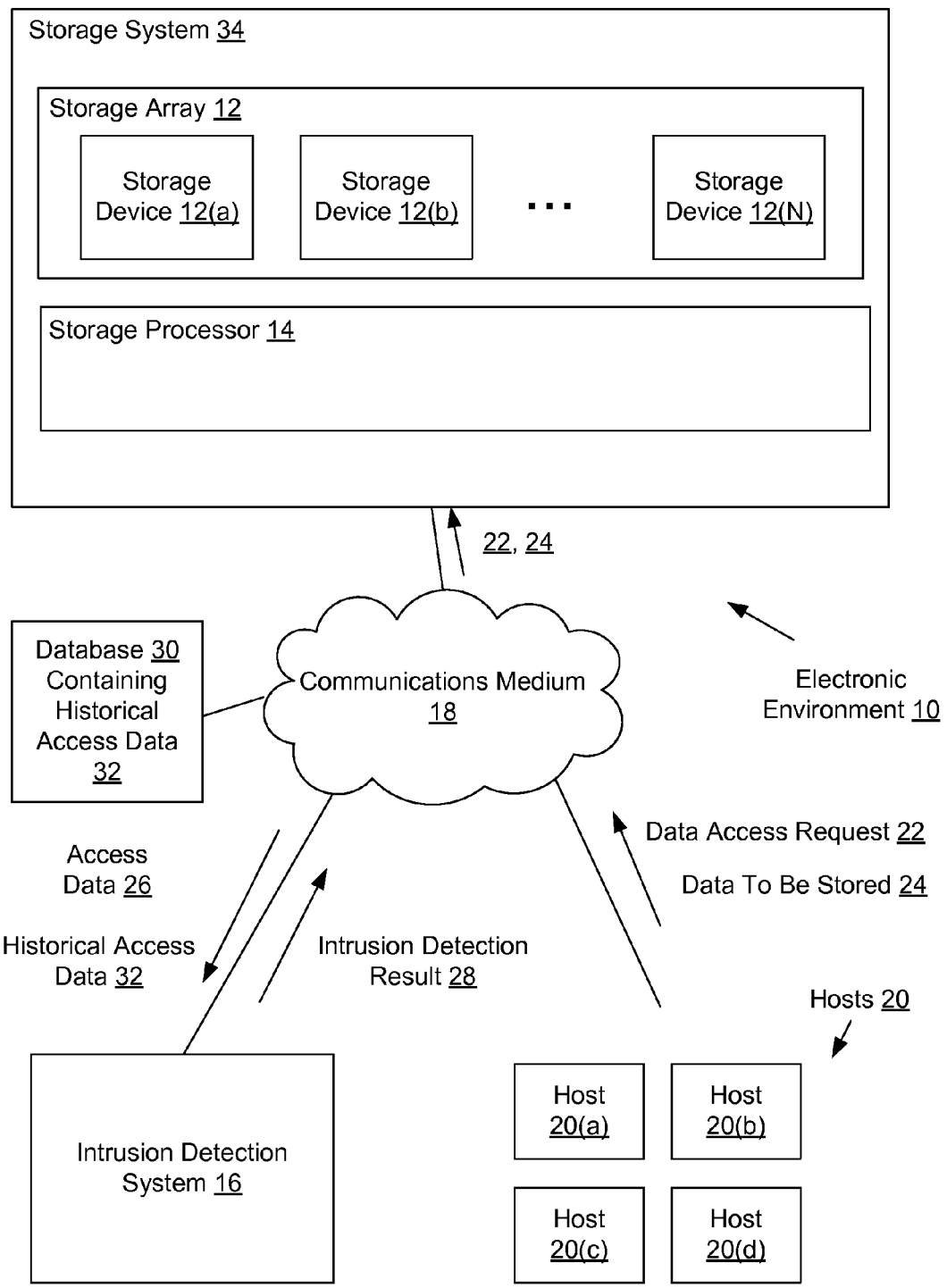
FIG. 1 is a block diagram illustrating an example electronic environment in which the improved technique may be carried out.

FIG. 1 illustrates an example electronic environment 10 in which the improved technique may be carried out. Electronic environment 10 includes storage system 34, which, in turn, includes one or more storage arrays 12 and one or more storage processors 14. Electronic environment 10 also includes intrusion detection system 16, communications medium 18, hosts 20, and database 30.

Storage system 34 may be, for example, a VNX Series data storage system produced by the EMC Corp. of Hopkinton, Mass. Storage array 12 is configured to store and access data in response to read and write commands from storage processor 14. Storage array 12 includes storage devices 12(a), 12(b), . . . , 12(N), where N is the number of storage devices in storage array 12. Storage array 12, in some arrangements, is a RAID array, e.g., RAID6 or RAID10.

Storage processor 14 is configured to carry out read and write commands from hosts 20 for storing and accessing data on storage array 12. Storage processor 14 is connected to hosts 20 via communications medium 18, although in some arrangements, storage processor may receive commands from some hosts 20 via a direct (i.e., wired) connection.

Storage processor 14 is also configured to run any number of application workloads via hosts 20, although in some arrangements, hosts 20 run the application workloads directly. Such application workloads issue read and write commands to access data on storage array 12 via storage processor 14. Applications may include Microsoft® Exchange Server by Microsoft Corp. of Redmond, Wash., VMware® by VMware, Inc. of Palo Alto, Calif., Hyper-V Server by Microsoft Corp. of Redmond, Wash., database applications, and the like.

It should be understood that read or write commands from an application workload exert a load on storage processor 14 to perform data access operations. Each user and application workload typically provides a pattern of data access via storage processor 14 at some particular time. For example, a Microsoft Exchange application run by one customer may allocate and deallocate space for mailboxes during a regular busy season when many new temporary employees are hired and let go, while staying relatively stable at other times.

Intrusion detection system 16 is configured to detect malicious application workloads accessing storage system 34 by comparing current access data 26 to historical access data 32 under similar circumstances. Intrusion detection system 16 may be a server or any computer that is capable of handling computations involved in performing comparisons between current and historical load profiles.

Communications medium 18 provides network connections between storage system 34, intrusion detection system 16, hosts 20, and database 30 that may be insecure. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Hosts 20 are constructed and arranged to allow users to read from and write to storage array 12 via applications running on one or more individual hosts, e.g., one of hosts 20(a), 20(b), 20(c), or 20(d), as depicted, or being accessed from one or more of these hosts. It should be understood that although four hosts 20(a), 20(b), 20(c), and 20(d) are depicted, there may actually be any number of hosts 20. Hosts 20(a), 20(b), 20(c), and 20(d) may take the form of servers, desktop computers, laptop computers, tablet computers, smartphones, virtual machines and the like.

Database 30 is configured to store historical access data 32 for use by intrusion detection system 16. Database 30 receives historical access data 32 from storage processor 14 either in response to suspected unusual behavior, or on a regular basis, either continuously or periodically. Database 30 is also configured to provide intrusion detection system 16 particular historical access data 32 either in response to a request from intrusion detection system 16 or on a regular basis. Database 30, in some arrangements, ispre-loaded with preliminary known historical access data from a similar system physically located in other place. Content of database 30 might be considered as partially or completely redistributable and be another customer service provided by EMC. Database 30 can either be a structured database (e.g., Greenplum by EMC Corp. of Hopkinton, Mass.), or an unstructured database (e.g., Hadoop by EMC Corp.).

It should be understood that historical access data 32 represents data that was taken during a time when storage system 12 was substantially free of malicious application workloads. Thus, historical access data 32 represents access data that may represent "normal" operations of storage system 34.

During operation, intrusion detection system 16 receives access data 26 from storage processor 14 via communications medium 18. Access data 26 includes parameter values that may take the form of a complete time series sampled at intervals of, e.g., 5 milliseconds, 10 milliseconds, or as long as 1 second, 2 seconds, or more, over a period of time of e.g., 10 seconds, 1 minute, 5 minutes, 1 hour, or longer. In some arrangements, however, access data 26 may take the form of streaming data that is recorded in database 30 in real time. For example, access data 26 may take the form of values of parameters such as allocations in GB, locality of I/O, maximum required IOPS, or the like. In addition, access data 26 includes values of identifiers that identify the application workload, user, and timestamp associated with the received parameter values.

It should be understood that intrusion detection system 16 may, in some arrangements, be co-located with storage processor 14 rather than be connected over communications medium 18.

After receiving access data 26, intrusion detection system 16 obtains historical access data 32 from database 30. Intrusion detection system 16 performs a lookup in database 30 using the values of the identifiers associated with the received parameter values in access data 26. If there is no historical access data associated with those parameter values, then intrusion detection system 16 may issue an exception or, alternatively, look for the historical access data with identifiers that most closely matched the received identifier values.

It should be understood that access data 26 and historical access data 32 represent parameter values sampled over substantially the same period of time. In case access data 26 and historical access data 32 are not sampled over the same period of time, intrusion detection system 16 uses the shorter of the sample periods.

Once intrusion detection system 16 has obtained access data 26 and historical access data 32, intrusion detection system 16 performs a comparison between access data 26 and historical access data 32. For example, intrusion detection system 16 generates a difference between the values of the parameters in access data 26 and historical access data 32 over the length of time of the data sets. Such a difference is indicative of the difference, or similarity, between access data 26 and historical access data 32. Further details of the generation of the difference will be discussed below in connection with FIG. 3.

Intrusion detection system 16 then provides a decision as to whether storage system 34 is accessed by a malicious application workload based on the comparison between access data 26 and historical access data 32. For example, intrusion detection system 16 may compare the generated difference with a threshold difference; when the difference exceed the threshold difference, intrusion detection system 16 determines that there is a malicious application workload accessing storage system 34 and notifies an administrator or other responsible party.

Further details of intrusion detection system 16 are discussed below in connection with FIG. 2.

Figure 2:
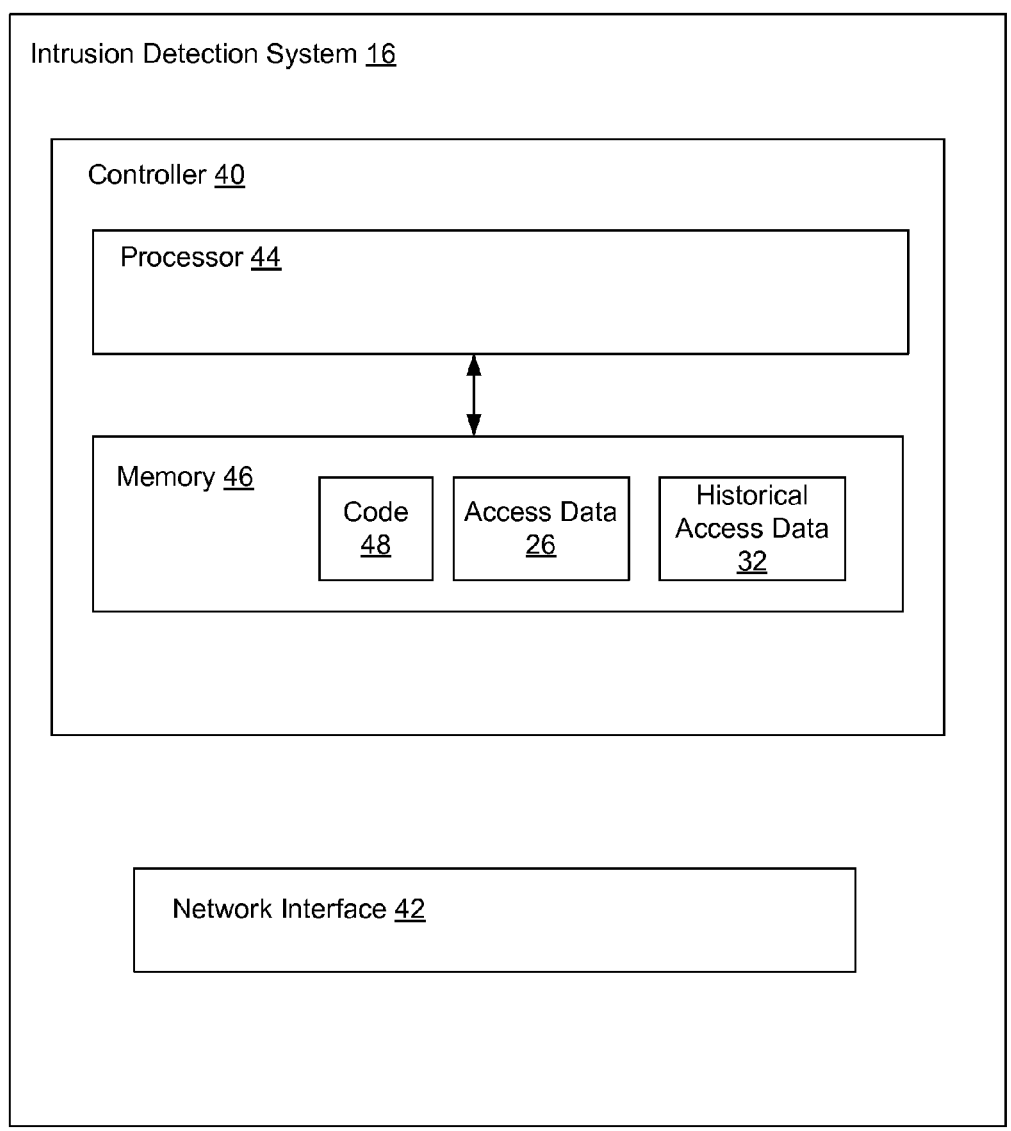
FIG. 2 is a block diagram illustrating an example intrusion detection system, within the electronic environment shown in FIG. 1.

FIG. 2 illustrates intrusion detection system 16. Intrusion detection system 16 includes controller 40, which in turn includes processor 44 and memory 46; and network interface 42.

Network interface 42 takes the form of an Ethernet card; in some arrangements, network interface 42 takes other forms including a wireless receiver and a token ring card. In other arrangements, network interface 42 includes an interface for NFC communications for receiving data over an NFC connection.

Memory 46 is configured to store code 48 that contains instructions to monitor storage system 34 for viruses. Memory 46 generally takes the form of, e.g., random access memory, flash memory, or a non-volatile memory.

Processor 44 takes the form of, but is not limited to, Intel or AMD-based CPUs, and can include a single or multi-cores each running single or multiple threads. Processor 44 is coupled to memory 46 and is configured to execute instructions from code 48.

Such instructions include causing intrusion detection system 16 to evaluate a difference between access data 26 and historical access data 32. Further details of such an evaluation are discussed below in connection with FIG. 3.

Figure 3:
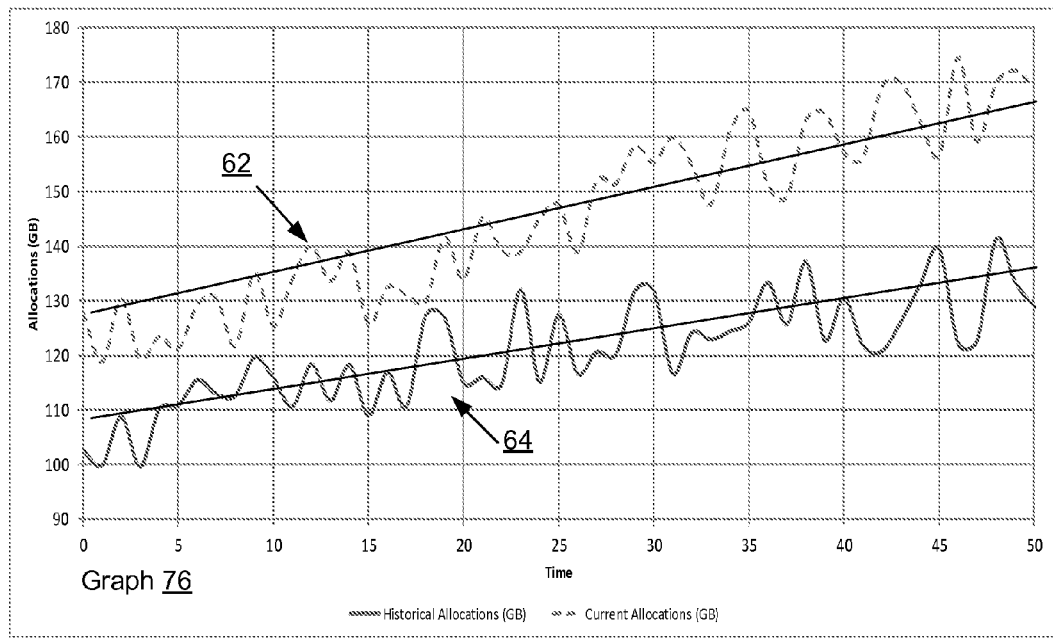
FIG. 3 is a block diagram illustrating an example malicious application workload detection within the intrusion detection system shown in FIG. 2.

FIG. 3 illustrates an example malicious application workload detection process 60 within intrusion detection system 16. Malicious application workload detection process 60 involves intrusion detection system 16 analyzing data involving allocations of storage in storage system 34 over time, computing a difference between the graphs, and formulating a decision about whether there is a malicious application workload accessing storage system 34 based on the difference.

Graph 76 illustrates trends of allocations of storage in storage array 12 by storage processor 14. For example, dataset 64 represents historical allocations of storage from, e.g., a Microsoft Exchange server application. Although there are fluctuations on a short-time scale, there is a longer-term trend representing a roughly linear increase in storage allocations over the sampling period. The line within the dataset represents a trendline indicative of an average rate of increase of allocations over time. In some arrangements, the trendlines are least-squares best-fit lines.

Dataset 62, on the other hand, represents current allocations of storage from that Microsoft Exchange server application. As illustrated in FIG. 3, the trendline corresponding to dataset 62 is indicative of a larger average rate of increase of allocations over time than that shown for dataset 64.

Intrusion detection 16 computes the difference 66 between datasets 62 and 64 to produce a difference value. In some arrangements, intrusion detection system 16 computes, as the difference, the difference in the slopes of the trendlines. In other arrangements, intrusion detection system 16 computes the sum of the absolute value of the differences between datasets 62 and 64 for each data point.

Based on difference 66, intrusion detection system 16 provides a decision 70 as to whether there is a malicious application workload accessing storage system 34. For example, in some arrangements, intrusion detection system 16 compares difference 66 with a threshold difference 68. If difference 66 exceeds threshold difference 68, then decision 70 is that there is a malicious application workload accessing storage system 34; if difference 66 is less than threshold difference 68, then decision 70 is that there is no malicious application workload accessing storage system 34. If decision 70 is that there is a malicious application workload accessing storage system 34, then intrusion detection system 16 provides a recommendation of action 72 to take regarding the malicious application workload.

It should be understood that intrusion detection system 16, in some arrangements, may also incorporate a feedback loop 74 for improving the accuracy of malicious application workload detection. For example, an administrator for storage system 34 observes, using independent means, that decision 70 as to whether there is a malicious application workload accessing storage system 34 is correct or not. As part of feedback loop 74, the administrator sends the actual status of whether a malicious application workload accesses storage system 34 back to intrusion detection system 16. In response, intrusion detection system 16 adjusts threshold difference 68, for example, according to feedback 74.

FIG. 4 illustrates a method 100 of monitoring a data storage system for malicious application workloads, including steps 102, 104, and 106. In step 102, a set of values of a parameter is collected over a particular period of time, each set of values being indicative of a state of the data storage system over the particular period of time. In step 104, a comparison operation is performed on (i) the set of values of the parameter and (ii) a set of historical values of the parameter over another period of time prior to the particular period of time and having a length substantially the same as the particular period of time, the set of historical values of the parameter being representative of values of the state of the data storage system substantially free of malicious application workloads, the comparison operation providing a comparison result indicative of a similarity between the set of values of the parameter and the set of historical values of the set of the parameters. In step 106, a decision is provided as to whether the data storage system is accessed by a malicious application workload based on the comparison result.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

It should be understood that the improvement described here has a number of applications, including providing a technique for monitoring a data storage system for malicious application workloads.

Having described certain embodiments, numerous alternative embodiments or variations can be made. For example, the above discussion dealt mainly with monitoring a data storage system for virus attacks within a storage system having a disk array. In some arrangements, however, storage system 34 may include solid-state disks or any other configuration susceptible to malicious application workloads.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of monitoring a data storage system for malicious application workloads, the method comprising:
    collecting, by a computing device, a set of values of a data storage parameter (hereinafter "parameter") over a particular period of time, each set of values being indicative of a storage-related state of the data storage system over the particular period of time, wherein collecting the set of values over the particular period of time includes collecting a number of storage allocation requests sampled at pre-specified intervals over the particular period of time;
    performing a comparison operation, by the computing device, on (i) the set of values of the parameter and (ii) a set of historical values of the parameter over another period of time prior to the particular period of time and having a length substantially the same as the particular period of time, the set of historical values of the parameter being representative of values of the storage-related state of the data storage system substantially free of malicious application workloads, the comparison operation providing a comparison result indicative of a similarity between the set of values of the parameter and the set of historical values of the set of the parameters; and
    based on the comparison result, providing, by the computing device, a decision as to whether the data storage system is accessed by a malicious application workload; wherein:
    performing the comparison operation includes generating a difference between the set of values of the parameter over the particular period of time and the set of historical values of the parameter over the other period of time by:
        fitting the set of values of the parameter over the particular period of time to a first trendline,
        fitting the set of historical values of the parameter over the other period of time to a second trendline,
        calculating respective slopes of the first and second trendlines, and
        determining a difference between the respective slopes of the first and second trendlines as the comparison result;
    providing the decision as to whether the data storage system is accessed by a malicious application workload includes comparing the difference to a threshold difference, the difference being greater than the threshold difference indicating that the data storage system is accessed by a malicious application workload, the difference being less than the threshold difference indicating that the data storage system is not accessed by a malicious application workload;
    the method further comprises, based on the comparison result, providing, by the computing device, a further decision as to whether the data storage system is in need of a reconfiguration; and
    providing the further decision as to whether the data storage system is in need of a reconfiguration includes:
        receiving feedback as to whether the data storage system has actually been accessed by a malicious application workload when the difference is greater than the threshold difference,
        when the data storage system has not been accessed by a malicious application workload, providing as the further decision that the data storage system is in need of the reconfiguration, and
        when the data storage system has been accessed by a malicious application workload, providing as the further decision that the data storage system is to be left without reconfiguration.

2. A method as in claim 1, further comprising:
    collecting the set of historical values of the parameter over the other period of time, and
    storing the set of historical values of the parameter in a database apart from the data storage system; and
    wherein performing the comparison operation on the set of values of the parameter and the set of historical values of the parameter includes:
        extracting the set of historical values of the parameter from the database.

3. A method as in claim 2,
wherein the set of historical values of the parameter and the set of values of the parameter each include a set of metadata that includes a value of a user identifier;
wherein extracting the set of historical values of the parameter from the database includes:
matching the value of the user identifier of the set of historical values of the parameter to the value of the user identifier of the set of values of the parameter.

4. A method as in claim 3,
wherein the set of metadata further includes a value of an application workload identifier which identifies an application workload which ran over the other period of time and the particular period of time;
wherein extracting the set of historical values of the parameter from the database further includes:
matching the value of the application workload identifier of the set of historical values of the parameter to the value of the application identifier of the set of values of the parameter.

5. A method as in claim 1 wherein the pre-specified intervals are fixed periodic intervals of less than two seconds.

6. A method as in claim 5 wherein the particular period of time is within a range of ten seconds to five minutes.

7. An apparatus constructed and arranged to monitor a data storage system for malicious application workloads, the apparatus comprising:
a network interface;
memory; and
a controller including controlling circuitry coupled to the memory, the controlling circuitry being constructed and arranged to:
collect a set of values of a data storage parameter (hereinafter "parameter") over a particular period of time, each set of values being indicative of a storage-related state of the data storage system over the particular period of time, wherein collecting the set of values over the particular period of time includes collecting a number of storage allocation requests sampled at pre-specified intervals over the particular period of time;
perform a comparison operation on (i) the set of values of the parameter and (ii) a set of historical values of the parameter over another period of time prior to the particular period of time and having a length substantially the same as the particular period of time, the set of historical values of the parameter being representative of values of the storage-related state of the data storage system substantially free of malicious application workloads, the comparison operation providing a comparison result indicative of a similarity between the set of values of the parameter and the set of historical values of the set of the parameters; and
based on the comparison result, provide a decision as to whether the data storage system is accessed by a malicious application workload;
wherein:
the controlling circuitry constructed and arranged to perform the comparison operation is further constructed and arranged to generate a difference between the set of values of the parameter over the particular period of time and the set of historical values of the parameter over the other period of time by:
fitting the set of values of the parameter over the particular period of time to a first trendline,
fitting the set of historical values of the parameter over the other period of time to a second trendline,
calculating respective slopes of the first and second trendlines, and
determining a difference between the respective slopes of the first and second trendlines as the comparison result;
the controlling circuitry constructed and arranged to provide the decision as to whether the data storage system is accessed by a malicious application workload is further constructed and arranged to compare the difference to a threshold difference, the difference being greater than the threshold difference indicating that the data storage system is accessed by a malicious application workload, the difference being less than the threshold difference indicating that the data storage system is not accessed by a malicious application workload;
the controlling circuitry is further constructed and arranged to, based on the comparison result, provide a further decision as to whether the data storage system is in need of a reconfiguration; and
the controlling circuitry constructed and arranged to provide the further decision as to whether the data storage system is in need of a reconfiguration is further constructed and arranged to:
receive feedback as to whether the data storage system has actually been accessed by a malicious application workload when the difference is greater than the threshold difference,
when the data storage system has not been accessed by a malicious application workload, provide as the further decision that the data storage system is in need of the reconfiguration, and
when the data storage system has been accessed by a malicious application workload, provide as the further decision that the data storage system is to be left without reconfiguration.

8. An apparatus as in claim 7, wherein the controlling circuitry is further constructed and arranged to:
collect the set of historical values of the parameter over the other period of time, and
store the set of historical values of the parameter in a database apart from the data storage system; and
wherein the controlling circuitry constructed and arranged to perform the comparison operation on the set of values of the parameter and the set of historical values of the parameter is further constructed and arranged to:
extract the set of historical values of the parameter from the database.

9. An apparatus as in claim 8,
wherein the set of historical values of the parameter and the set of values of the parameter each include a set of metadata that includes a value of a user identifier;
wherein the controlling circuitry constructed and arranged to extract the set of historical values of the parameter from the database is further constructed and arranged to:
match the value of the user identifier of the set of historical values of the parameter to the value of the user identifier of the set of values of the parameter.

10. An apparatus as in claim 9,
wherein the set of metadata further includes a value of an application workload identifier which identifies an application workload which ran over the other period of time and the particular period of time;

wherein the controlling circuitry constructed and arranged to extract the set of historical values of the parameter from the database further is further constructed and arranged to:
match the value of the application workload identifier of the set of historical values of the parameter to the value of the application workload identifier of the set of values of the parameter.

11. A computer program product having a non-transitory, computer-readable storage medium which stores instructions that, when executed by a computer, causes the computer to carry out a method of monitoring a data storage system for malicious application workloads, the method comprising:
collecting a set of values of a data storage parameter (hereinafter "parameter") over a particular period of time, each set of values being indicative of a storage-related state of the data storage system over the particular period of time, wherein collecting the set of values over the particular period of time includes collecting a number of storage allocation requests sampled at pre-specified intervals over the particular period of time;
performing a comparison operation on (i) the set of values of the parameter and (ii) a set of historical values of the parameter over another period of time prior to the particular period of time and having a length substantially the same as the particular period of time, the set of historical values of the parameter being representative of values of the storage-related state of the data storage system substantially free of malicious application workloads, the comparison operation providing a comparison result indicative of a similarity between the set of values of the parameter and the set of historical values of the set of the parameters; and
based on the comparison result, providing a decision as to whether the data storage system is accessed by a malicious application workload; wherein:
performing the comparison operation includes generating a difference between the set of values of the parameter over the particular period of time and the set of historical values of the parameter over the other period of time by:
fitting the set of values of the parameter over the particular period of time to a first trendline,
fitting the set of historical values of the parameter over the other period of time to a second trendline,
calculating respective slopes of the first and second trendlines, and
determining a difference between the respective slopes of the first and second trendlines as the comparison result;
providing the decision as to whether the data storage system is accessed by a malicious application workload includes comparing the difference to a threshold difference, the difference being greater than the threshold difference indicating that the data storage system is accessed by a malicious application workload, the difference being less than the threshold difference indicating that the data storage system is not accessed by a malicious application workload;
the method further comprises, based on the comparison result, providing a further decision as to whether the data storage system is in need of a reconfiguration; and
providing the further decision as to whether the data storage system is in need of a reconfiguration includes:
receiving feedback as to whether the data storage system has actually been accessed by a malicious application workload when the difference is greater than the threshold difference,
when the data storage system has not been accessed by a malicious application workload, providing as the further decision that the data storage system is in need of the reconfiguration, and
when the data storage system has been accessed by a malicious application workload, providing as the further decision that the data storage system is to be left without reconfiguration.

12. A computer program product as in claim 11, wherein the method further comprises:
collecting the set of historical values of the parameter over the other period of time, and
storing the set of historical values of the parameter in a database apart from the data storage system; and
wherein performing the comparison operation on the set of values of the parameter and the set of historical values of the parameter includes:
extracting the set of historical values of the parameter from the database.

13. A computer program product as in claim 12,
wherein the set of historical values of the parameter and the set of values of the parameter each include a set of metadata that includes a value of a user identifier;
wherein extracting the set of historical values of the parameter from the database includes:
matching the value of the user identifier of the set of historical values of the parameter to the value of the user identifier of the set of values of the parameter.

14. A computer program product as in claim 13,
wherein the set of metadata further includes a value of an application workload identifier which identifies an application workload which ran over the other period of time and the particular period of time;
wherein extracting the set of historical values of the parameter from the database further includes:
matching the value of the application workload identifier of the set of historical values of the parameter to the value of the application workload identifier of the set of values of the parameter.

* * * * *